May 22, 1928.

W. PRINGLE

Re. 16,976

JETTY

Original Filed May 24, 1924 2 Sheets-Sheet 1

May 22, 1928. Re. 16,976

W. PRINGLE

JETTY

Original Filed May 24, 1924 2 Sheets-Sheet 2

Inventor:
Wayne Pringle
By: Wallace R. Lane
Atty.

Reissued May 22, 1928. Re. 16,976

UNITED STATES PATENT OFFICE.

WAYNE PRINGLE, OF LINCOLN, NEBRASKA, ASSIGNOR TO WOODS BROTHERS CORPORATION, OF WILMINGTON, DELAWARE, A CORPORATION OF DELAWARE.

JETTY.

Original No. 1,646,168, dated October 18, 1927, Serial No. 715,539, filed May 24, 1924. Application for reissue filed February 20, 1928. Serial No. 255,804.

The present invention relates to jetties or stream barriers of the type used in a flowing stream or current for forming a silt bar or the like.

Among the objects of the invention are to provide a novel jetty and jetty sections which may be located in a flowing stream or current and capable of efficiently collecting silt for forming bars and the like; to provide a jetty with an inclined surface or face upon which the silt may be deposited or held in place; to provide a jetty with longitudinal elements, spaced and extending so as to aid in collecting silt, and preferably, to support a silt collector, such as wire mesh material or the like; to provide a jetty with open mesh material, such as wire fabric, for the depositing thereon of the silt; to provide a support for the same, preferably comprising a longitudinal bar, to which may be fastened or secured one or more transverse bars, preferably intermediate their ends, and means, such as strut or supporting bars, preferably fastened at one end thereof to the first mentioned bars, for holding the latter in an inclined or oblique position whereby the fabric may be supported thereon in position for the silt collection; to provide on such supports longitudinal supporting elements, preferably, in the form of cables or wires extending the length of the jetty or barrier with the ends of the cables preferably connected at their ends to an end cross bar or transverse bar of the jetty at each end thereof, to the end of aiding in supporting the wire mesh; to connect the supporting sections in a line or row by connecting the adjacent ends of the longitudial bars together, and holding the sections in place by suitable anchoring means, such as tie elements from piles in the bed of the stream or bank and dead men in the bank; to provide for a permeable barrier, if desired, at the rear of the jetty to aid in retarding the rate of flow of the stream and in the collecting of the silt upon the barrier and jetty, the barrier preferably being a series of groups of trees or branches extending rearwardly from the jetty and secured thereto in suitable manner; and to provide such other objects, advantages and capabilities as will later appear and are inherently possessed by the invention.

Figure 1:
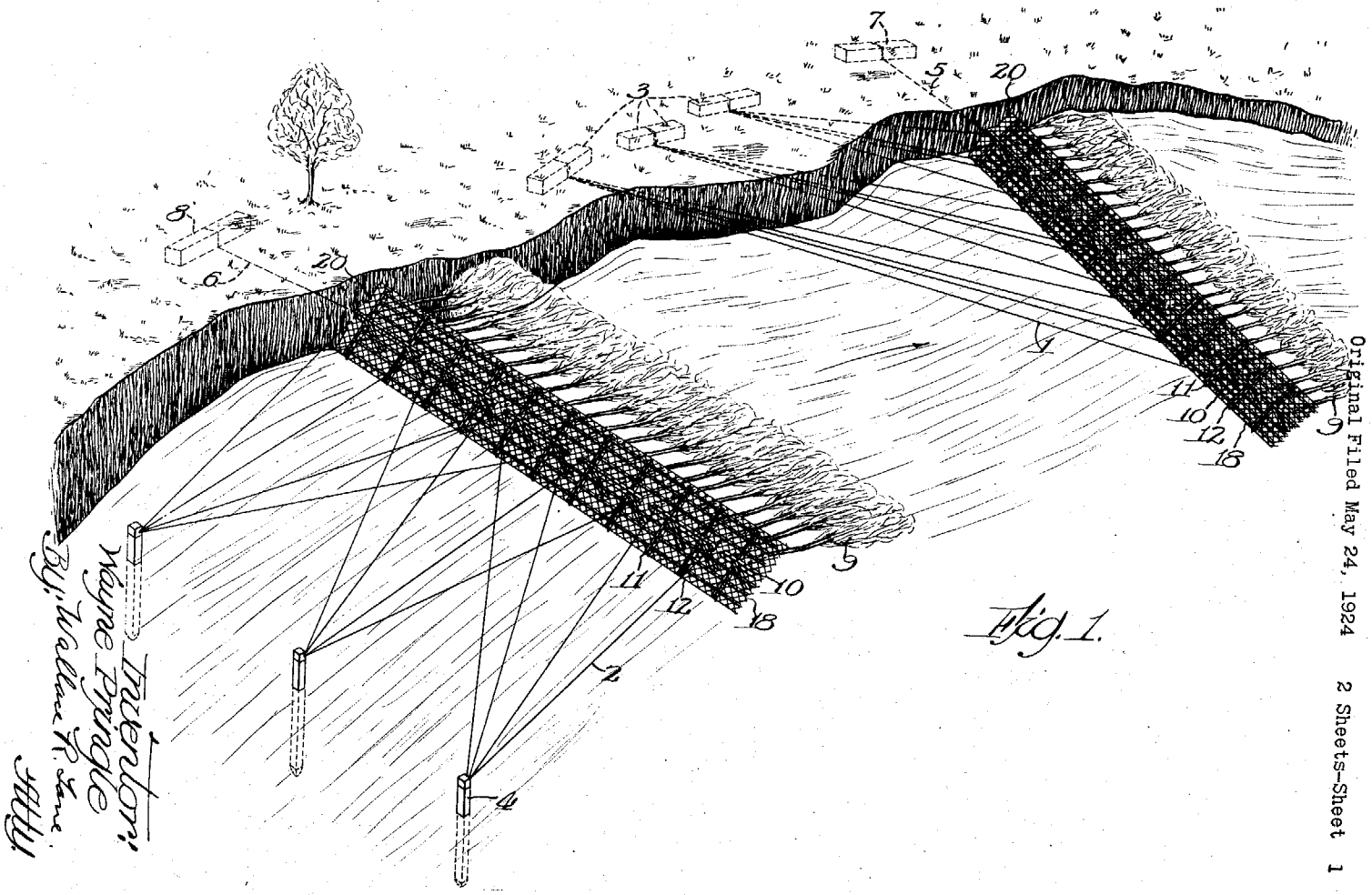
Figure 2:
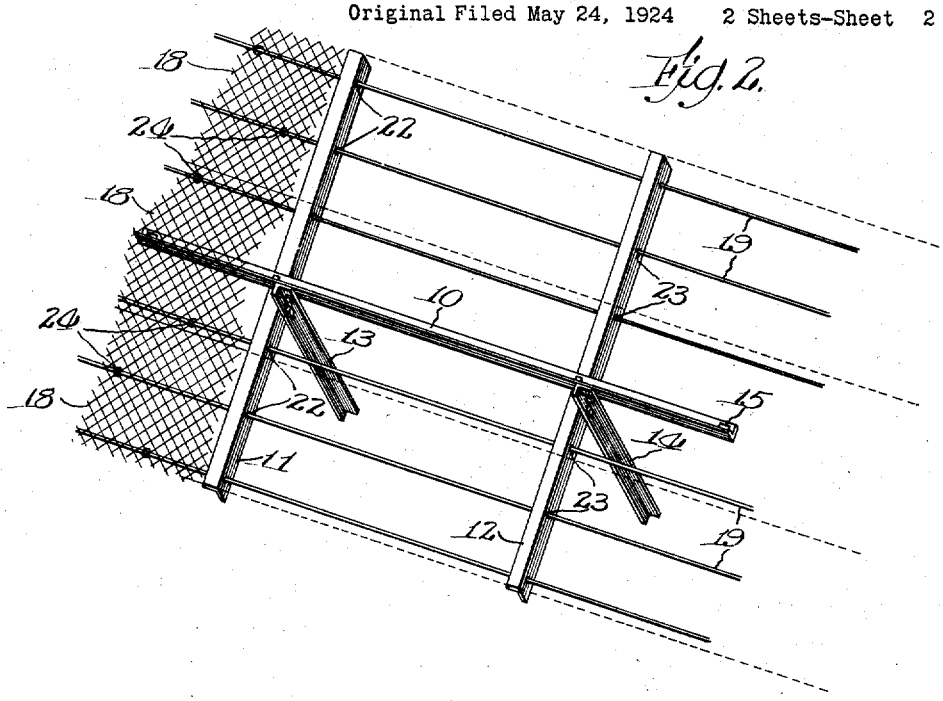
Figure 3:
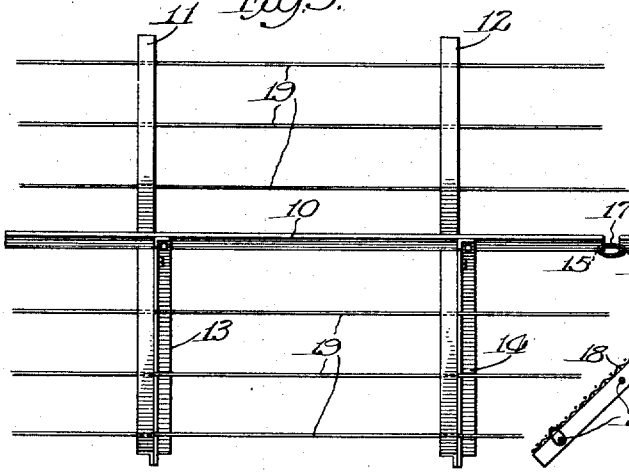

Referring to the drawings showing an illustrative embodiment of the invention, Fig. 1 is a view in perspective of a stream or river in which the jetties are located; Fig. 2 is a perspective view of a unit or section or segment constructed in accordance with the invention; Fig. 3 is a front view of the same; and, Fig. 4 is an end view of the same.

Referring more in detail to the drawings, the invention is shown in use in Fig. 1 where sections are connected together longitudinally and the line of sections are held in place by suitable connecting or tie elements 1 and 2 respectively connected to dead men 3 buried in the bank of the stream or piles 4 sunk in the bed of the stream. The bank end of each barrier or jetty may also be connected by a suitable element 5 or 6 secured to dead men 7 and 8 also buried in the bank.

At the rear of each jetty may be located a series of trees or branches 9 suitably connected to the jetty or jetty sections by tie elements preferably connected to the horizontal section bars of the jetty.

Figure 4:
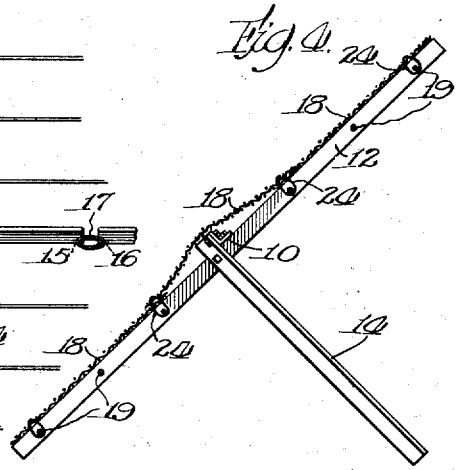

Referring more particularly to Figs. 2, 3 and 4, each section is shown as comprising a longitudinal bar 10, preferably of angle iron to which may be secured, at a distance from the end of the bar 10, a pair of substantially parallel spaced transverse bars 11 and 12, also preferably of angle iron, and supporting or strut bars 13 and 14 which are preferably secured at an end thereof to the longitudinal and transverse bars at the junctures of the longitudinal and transverse bars, the free ends of the strut bars 13 and 14 extending laterally from the longitudinal and transverse bars, and adapted to rest on the bed of the stream, at the rear of the jetty.

It will thus be seen that the longitudinal and transverse bars form a sort of double cross which is held in inclined position by the strut bars 13 and 14. The jetty is composed of these angle bar constructions as sections or segments of the jetty, any number of sections being arranged in a row or line to the desired length of the jetty to be placed in the stream as shown in Fig. 1 of the drawings. In order to connect the sections or units in alinement, the longitudinal bars are provided at the ends thereof with suitable apertures or openings 15 and 16 through which may be passed the connecting element 17, preferably wire or similar connecting means. The weight of the sections is sufficient to hold them in place on the bed of the stream and the rolling of the jetty is prevented by the tie elements 1 and 2 connected to the dead men 3 and the piles 4. The connecting elements 1 and 2 are preferably connected, at the jetty ends, to the longitudinal bars 10 as clearly shown in Fig. 1 of the drawings.

For the purpose of aiding in collecting the silt upon the face of the jetty, the face being that of the longitudinal and transverse bars, strips or sheets of wire mesh or like fabric 18 may be placed to overlie such face. This wire fabric is preferably in long sheets that may be laid upon the face of the sections for the total length of a jetty, the strips being cut at the ends of the jetty. A number of these strips may be placed upon the jetty side by side so as to completely cover the face thereof. In the specific form shown three strips are shown but it is to be understood any number of strips may be used depending upon the total width or height of the face of the jetty.

While these strips may be sufficiently supported by the longitudinal and cross bars of the jetty section, yet, when it is desired to support them more efficiently, the jetty may be provided with a plurality of spaced longitudinal elements 19, preferably of wire or cable extending the full length of the jetty. These elements are connected at their ends to the end cross bars 20 and 20 of the end sections of the jetties as shown in Fig. 1 of the drawings. The elements are then extended through suitable perforations or holes 22 and 23 provided in the cross bars 11 and 12 of the sections as clearly shown in Figs. 2, 3, and 4 of the drawings. The sheets or strips of wire mesh 18 may rest upon these elements and are preferably secured to these elements by suitable securing means 24, preferably wire or the like.

In order to aid in the collection of the silt upon the jetty and in rear of the same so as to build up a bank or prevent the erosion of the bank at the side of the stream a barrier of a permeable nature may be located at the rear of each jetty, this barrier being preferably formed from a series or bunches of trees or branches 9 as clearly shown in Fig. 1 of the drawings. These trees are placed substantially horizontally and extending rearwardly from the jetty with the stems or trunks of the trees connected to the jetty sections in suitable manner, as by cables or wires fastened to the longitudinal bars 10 of the sections of each jetty. These trees are bunched together so that they will extend a given distance above the normal surface or level of the stream. They act to retard the rate of flow of the stream so the silt and suspended matter in the water will have a chance to be deposited upon the jetty as well as upon the branches of the trees, and at the rear of the same.

The sections of the jetties are so positioned upon the bed of the stream to preferably present the sheet of material 18 on the up-stream side of the jetty so that it may efficiently gather or collect the silt and other débris flowing with the stream against the jetty.

While I have herein described and upon the drawings shown an illustrative embodiment of the invention, it is to be understood that it is not limited to the particular construction, details and arrangements of parts shown and described, but comprehends other constructions, details and arrangements of parts without departing from the spirit thereof.

Having thus described my invention, I claim:

1. A jetty comprising a longitudinal bar adapted to extend in a substantially horizontal plane when positioned in the flowing stream, upstanding bars spaced longitudinally of the first mentioned bar, struts connected to the juncture of the horizontal and upstanding bars for maintaining the upstanding bars in erect position, said upstanding bars and struts being adapted to have their lower ends lie upon the bed of the stream and a net work of wires extending over the front face of the jetty and being coextensive with the height of the upstanding bars and the length of the longitudinal bar.

2. A jetty comprising a longitudinal bar adapted to extend across the stream, spaced upstanding bars fastened intermediate their ends to the longitudinal bar, struts inclining rearwardly and connected at their upper ends to juncture of the former bars, the lower ends of the struts and upstanding bars being adapted to rest upon the bed of the stream, and a network of wire covering the face of and coextensive with the upstanding and longitudinal bars.

3. A jetty comprising a longitudinal metal angle iron, adapted to extend across the stream, spaced upstanding metal angle irons fastened intermediate their ends to the longitudinal bar, said upstanding members being maintained in erect position by means of struts secured to the juncture of the upstanding and longitudinal members and the lower ends of said struts and upstanding members being adapted to rest upon the bed of the stream, and a wire mesh screen fastened to and covering the entire area embraced by the extremities of the upright and longitudinal members and disposed upon the side opposite from which the struts project.

4. A jetty comprising a longitudinal metal angle iron adapted to extend across the stream, spaced metal angle irons fastened intermediate their ends to the longitudinal iron and disposed transversely thereto, struts attached to the junction of the longitudinal and transverse irons and extending downwardly and outwardly to form supports for holding the transverse members in upwardly inclined position, a plurality of wires connecting the transverse members and extending in spaced relation parallel to the longitudinal member, and wire screening covering the entire area of the wires.

5. In a jetty the combination of a longitudinal angle iron having a plurality of uprights connected thereto intermediate their ends and spaced longitudinally thereof, a strut fastened to the juncture of the longitudinal and upright members for holding the latter in inclined position, said uprights having a plurality of vertically spaced holes, and wires passing through the holes and extending a parallel spaced relation longitudinally of the longitudinal angle iron, and wire screening fastened to the wires and to the angle irons.

6. In a jetty the combination of a jetty composed of angle irons arranged to rest upon the bed of the stream with some irons of the jetty standing erect, silt detaining members carried by the jetty, cables connected to the jetty for anchoring the jetty in position in the stream, and a plurality of cables connected to the jetty and extending rearwardly thereof and trees anchored by means of said rearwardly extending cables to the jetty, said trees extending rearwardly of the jetty.

7. In combination with a jetty made of angle iron resting by its own weight upon the bed of the stream and anchored in position by means of cables, a plurality of trees positioned in the rear of the jetty and anchored to the jetty by means of flexible cables connected to the trunks of the trees.

8. In combination with an upright jetty positioned in a stream and having silt retaining members, a plurality of trees positioned in the rear of the jetty and anchored thereto by means of cables passing about the trunks of the trees.

9. In combination with an upright jetty positioned in a stream and having silt retaining members, a plurality of trees having branches, said trees extending rearwardly of the jetty with their branches further removed from the jetty than their trunk portions, and means for anchoring the trees to the jetty.

In witness whereof, I hereunto subscribe my name to this specification.

WAYNE PRINGLE.